(12) United States Patent
Song et al.

(10) Patent No.: US 12,339,150 B2
(45) Date of Patent: Jun. 24, 2025

(54) LIQUID OUTPOURING METHOD AND LIQUID OUTPOURING DEVICE

(71) Applicant: ZHENGZHOU SANHUA TECHNOLOGY & INDUSTRY CO., LTD., Henan (CN)

(72) Inventors: Zongqi Song, Henan (CN); Kunkun Zhang, Henan (CN); Guanghe Chen, Henan (CN)

(73) Assignee: ZHENGZHOU SANHUA TECHNOLOGY & INDUSTRY CO., LTD., Henan (CN)

( * ) Notice: Subject to any disclaimer, the term of this patent is extended or adjusted under 35 U.S.C. 154(b) by 0 days.

(21) Appl. No.: 18/681,747

(22) PCT Filed: Mar. 31, 2023

(86) PCT No.: PCT/CN2023/085411
§ 371 (c)(1),
(2) Date: Feb. 6, 2024

(87) PCT Pub. No.: WO2023/186076
PCT Pub. Date: Oct. 5, 2023

(65) Prior Publication Data
US 2024/0344872 A1      Oct. 17, 2024

(30) Foreign Application Priority Data
Apr. 2, 2022   (CN) .......................... 202210346904.4

(51) Int. Cl.
*G01F 15/00* (2006.01)
*G01F 23/20* (2006.01)
(Continued)

(52) U.S. Cl.
CPC ............ *G01F 15/001* (2013.01); *G01F 23/20* (2013.01); *G01G 17/04* (2013.01); *B65B 3/24* (2013.01);
(Continued)

(58) Field of Classification Search
CPC ...... G01F 15/001; G01F 15/005; G01F 23/20; G01G 17/04; B65B 3/24; B65B 3/28;
(Continued)

(56) References Cited

U.S. PATENT DOCUMENTS

| 4,467,844 A | * | 8/1984 | Di Gianfilippo | ....... G01F 23/20 340/613 |
| 4,648,430 A | * | 3/1987 | Di Gianfilippo | ...... G01G 13/08 177/60 |

(Continued)

FOREIGN PATENT DOCUMENTS

| CN | 110077638 A | 8/2009 |
| CN | 105756919 A | 7/2016 |

(Continued)

OTHER PUBLICATIONS

International Search Report, mailed Jul. 13, 2023 for PCT/CN2023/085411, filed Mar. 31, 2023. English translation attached.
(Continued)

*Primary Examiner* — Minh Q Le
(74) *Attorney, Agent, or Firm* — Barnes & Thornburg LLP

(57) ABSTRACT

A liquid outpouring method and a liquid outpouring device are provided. The liquid outpouring method comprises: outpouring, at a constant volume, a preset liquid at first outpouring precision; performing static weighing on the liquid which is outpoured at the constant volume, and determining an actual liquid outpouring amount; calculating a remaining liquid outpouring amount according to the
(Continued)

actual liquid outpouring amount and a target outpouring amount; and outpouring, at a constant volume, the remaining liquid outpouring amount at second outpouring precision, wherein the first outpouring precision is lower than the second outpouring precision, and an outpouring error of outpouring the liquid at the first outpouring precision is greater than an outpouring error of outpouring the liquid at the second outpouring precision.

14 Claims, 3 Drawing Sheets

(51) Int. Cl.
*G01G 17/04* (2006.01)
*B65B 3/24* (2006.01)
*B65B 3/28* (2006.01)
*B65B 3/30* (2006.01)
*G05D 7/06* (2006.01)
*G05D 11/13* (2006.01)

(52) U.S. Cl.
CPC . *B65B 3/28* (2013.01); *B65B 3/30* (2013.01); *G01F 15/005* (2013.01); *G05D 7/0623* (2013.01); *G05D 7/0682* (2013.01); *G05D 11/134* (2013.01); *Y02E 60/10* (2013.01)

(58) Field of Classification Search
CPC ...... B65B 3/30; G05D 7/0623; G05D 7/0682; G05D 11/134; Y02E 60/10
USPC .................................................. 137/1
See application file for complete search history.

(56) References Cited

U.S. PATENT DOCUMENTS

| | | | |
|---|---|---|---|
| 4,856,563 A * | 8/1989 | Yamaguchi | B65B 3/28 177/64 |
| 5,156,194 A * | 10/1992 | von Nehring | G01N 9/04 141/83 |
| 5,464,047 A * | 11/1995 | Muscara | B01F 33/84 141/156 |
| 5,515,888 A * | 5/1996 | Graffin | B65B 3/28 141/192 |
| 2003/0019885 A1* | 1/2003 | Luehrsen | B01F 33/84 222/94 |
| 2005/0276724 A1 | 12/2005 | Bremauer | |
| 2012/0037666 A1* | 2/2012 | Miller | G01F 15/005 222/255 |
| 2014/0209204 A1* | 7/2014 | Yamaguchi | C12M 33/04 141/95 |
| 2015/0021356 A1* | 1/2015 | Witchell | B01F 33/848 222/23 |
| 2016/0089646 A1 | 3/2016 | Lin et al. | |
| 2018/0274969 A1* | 9/2018 | Nagai | B65B 57/145 |
| 2020/0407096 A1* | 12/2020 | Ragazzini | G01G 17/06 |
| 2022/0048063 A1* | 2/2022 | Chen | G01F 15/005 |
| 2022/0179435 A1* | 6/2022 | Weber | G05D 9/12 |
| 2023/0175877 A1* | 6/2023 | Vine | G01F 15/001 222/368 |
| 2023/0236214 A1* | 7/2023 | Kuribayashi | G01N 35/1016 73/863.02 |

FOREIGN PATENT DOCUMENTS

| | | |
|---|---|---|
| CN | 107875965 A | 4/2018 |
| CN | 110585984 A | 12/2019 |
| CN | 210942361 U | 7/2020 |
| CN | 111701525 A | 9/2020 |
| CN | 113019254 A | 6/2021 |
| CN | 215323404 U | 12/2021 |
| CN | 114653299 A | 6/2022 |
| DE | 19512416 A1 | 11/1995 |
| WO | 2020220752 A1 | 5/2020 |

OTHER PUBLICATIONS

Written Opinion, mailed Jul. 13, 2023 for PCT/CN2023/085411, filed Mar. 31, 2023. English translation attached.
Chinese First Office Action, for Chinese Application No. 202210346904. 4. English translation attached.
First Search of Priority Application for Chinese Application No. 202210346904.4.
Notification to Grant Patent Right for Invention of Priority Application No. 202210346904.4. English translation attached.

* cited by examiner

Outpour, by the first outpouring device, the liquid of a set total volume $A_1$, where $A_v \geq A_1 \geq A_v - S$, $A_v$ is the target outpouring volume, and S is the single maximum outpouring volume of the second outpouring device meeting required precision Acquire a total outpoured liquid weight $A_{tw}$ through the static weighing Calculate a total actual outpouring volume $A_{tv}$ according to the total outpoured liquid weight $A_{tw}$ and the liquid density $\delta$; and calculate the remaining liquid outpouring amount according to the total actual outpouring volume $A_{tv}$ and the target outpouring amount $A_v$

FIG. 3

LIQUID OUTPOURING METHOD AND LIQUID OUTPOURING DEVICE

CROSS REFERENCE TO RELATED APPLICATIONS

This application is the U.S. national phase of PCT/CN2023/085411, filed on Mar. 31, 2023 which claims priority to the Chinese patent application with the filing number 202210346904.4 filed on Apr. 2, 2022 filed with the Chinese Patent Office and entitled "Liquid Outpouring Method and Liquid Outpouring Device", the contents of each of which is incorporated herein by reference in its entirety.

TECHNICAL FIELD

The present disclosure relates to the technical field of liquid outpouring, in particular to a liquid outpouring method and a liquid outpouring device using this method.

BACKGROUND ART

An existing colorant dispenser or paint mixing device is usually provided with multiple sets of color paste pumps, and each color paste pump is connected to a color paste bucket and a paste outlet respectively, so that the pumps can suck a color paste from the bucket and then pour out a certain amount of color paste from the paste outlet. One color paste is usually composed of a plurality of components. The colorant dispense device takes the color paste from corresponding color paste pumps according to formulation and quantitatively pours it out for mixing and color blending.

At present, there are two main measurement methods for color paste adding. When using the weight measurement method, a weighing module needs to feed an actual measurement value back to a control system in stages or constantly, and especially when a color paste adding amount is close to a target value, a dispensing speed needs to be lowered, and a weight value needs to be read frequently in real time, which seriously affects working efficiency. When the volume measurement method is used, high density stability is demanded for the color paste, and when bubbles are present in the color paste, sedimentation occurs to the color paste, and ambient temperature of the color paste changes, etc., a density of the color paste will be different in different time periods, consequently, the content of the color paste actually added does not meet requirements, thus the blending precision is reduced.

SUMMARY

The present disclosure mainly aims at providing a liquid outpouring method, which can solve the problems of low blending efficiency and low blending precision of a colorant dispenser in the prior art.

In order to realize the above objective, according to one aspect of the present disclosure, a liquid outpouring method is provided, including
outpouring, at a constant volume, a preset liquid at first outpouring precision;
performing static weighing on the liquid which is outpoured at the constant volume, and determining an actual liquid outpouring amount;
calculating, according to the actual liquid outpouring amount and a target outpouring amount, a remaining liquid outpouring amount; and
outpouring, at a constant volume, the remaining liquid outpouring amount at second outpouring precision, wherein the first outpouring precision is lower than the second outpouring precision, and an outpouring error of outpouring the liquid at the first outpouring precision is greater than an outpouring error of outpouring the liquid at the second outpouring precision.

Further, the liquid at the first outpouring precision is outpoured by the first outpouring device according to a set volume, and the liquid at the second outpouring precision is outpoured by the second outpouring device according to a set volume, and before a step of quantitatively outpouring the preset liquid at the first outpouring precision, the method further includes:
determining a maximum outpouring amount per time of the first outpouring device, a single maximum outpouring amount of the second outpouring device meeting required precision, and the target outpouring amount; and
determining the number of outpouring times of the first outpouring device according to the maximum outpouring amount per time of the first outpouring device, the single maximum outpouring amount of the second outpouring device, and the target outpouring amount, so that the remaining liquid outpouring amount after last outpouring of the first outpouring device is less than or equal to the single maximum outpouring amount of the second outpouring device.

Further, the step of determining a maximum outpouring amount per time of the first outpouring device includes:
taking the single maximum outpouring amount of the second outpouring device as a maximum error of outpouring per time of the first outpouring device; and
determining the maximum outpouring amount per time of the first outpouring device according to the maximum error of outpouring per time of the first outpouring device, so that an error generated by one time maximum outpouring amount of the last outpouring of the first outpouring device is less than or equal to the preceding maximum error.

Further, the step of calculating according to the actual liquid outpouring amount and a target outpouring amount a remaining liquid outpouring amount includes:
when the target outpouring amount is in weight,
acquiring a total actual liquid outpouring volume $A_{1v}$ and a total outpoured liquid weight $A_{1w}$, and making $A_W \geq A_{1w} \geq A_W - S*\delta$, where $A_W$ is a target outpouring weight, and S is a single maximum outpouring volume of the second outpouring device meeting required precision; and
determining the remaining liquid outpouring amount according to a liquid density $\delta$ calculated by the total actual liquid outpouring volume $A_{1v}$ and the total outpoured liquid weight $A_{1w}$.

Further, the liquid density $\delta$ is obtained through following steps:
acquiring a maximum possible density $\delta_{max}$ of specific gravity of the liquid;
calculating, according to the maximum possible density $\delta_{max}$, a maximum outpouring volume $A_{VT}$ quantitatively outpoured for the first time at the first outpouring precision;
statically weighing an actual liquid weight $A_{w1}$ outpoured at the constant volume for the first time; and calculating an actual liquid density $\delta = A_{w1}/A_{v1}$.

Further, before a step of quantitatively outpouring the remaining liquid outpouring amount at second outpouring precision, wherein the first outpouring precision is lower than the second outpouring precision, the method further includes:

setting an outpouring volume of the last outpouring of the first outpouring device as $A_{n+1}$, $A_{n+1} = (A_W - \Sigma A_{wn} - \Delta A)/\delta$, where $A_{wn}$ is a static weight of the liquid of an outpoured volume after the n-th time, and a maximum possible error corresponding to $A_{n+1}$ is $\Delta A \leq S$; and performing, after the first outpouring device completes the last outpouring, the static weighing on the liquid outpoured for the (n+1)-th time, to acquire a static weight $A_{W(n+1)}$ for the (n+1)-th time; and calculating the remaining liquid outpouring volume $\Delta V_n = (A_W - \Sigma AW_{(n+1)})/\delta$.

Further, the step of calculating according to the actual liquid outpouring amount and a target outpouring amount a remaining liquid outpouring amount includes:

when the liquid density $\delta$ is known, and the target outpouring amount is in volume, outpouring, by the first outpouring device, the liquid of a total volume $A_1$, where $A_V \geq A_1 \geq A_V - S$, $A_V$ is the target outpouring volume, and S is the single maximum outpouring volume of the second outpouring device meeting required precision;

acquiring a total outpoured liquid weight $A_{1w}$ through the static weighing; and calculating a total actual outpouring volume $A_{1v}$ according to the total outpoured liquid weight $A_{1w}$ and the liquid density $\delta$; and calculating the remaining liquid outpouring amount according to the total actual outpouring volume $A_{1v}$ and the target outpouring amount $A_V$.

Further, before the step of quantitatively outpouring the remaining liquid outpouring amount at second outpouring precision, wherein the first outpouring precision is lower than the second outpouring precision, the method further includes:

setting an outpouring volume of the last outpouring of the first outpouring device as $A_{n+1}$, $A_{n+1} = A - \Sigma A_{vn} - \Delta A$, where $A_{vn}$ is a total actual volume of the liquid of an outpoured volume, and a maximum possible error corresponding to $A_{n+1}$ is $\Delta A \leq S$;

performing, after the first outpouring device completes the last outpouring, the static weighing on the outpoured liquid to acquire a static weight $\Sigma A_{W(n+1)}$;

calculating an actual volume $\Sigma A_{V(n+1)} = \Sigma A_{W(n+1)}/\delta$ of the outpoured liquid; and calculating the remaining liquid outpouring amount $\Delta V_n = A_V - \Sigma A_{V(n+1)}$.

Further, the liquid outpouring method further includes: performing the static weighing on the outpoured liquid after finally completing the liquid outpouring, and verifying whether the outpoured liquid meets precision requirement.

According to another aspect of the present disclosure, provided is a liquid outpouring device using the above liquid outpouring method, including:

a first outpouring device, capable of quantitatively outpouring a liquid at first outpouring precision;

a second outpouring device, capable of quantitatively outpouring the liquid at second outpouring precision;

a liquid container, configured to carry the liquid outpoured by the first outpouring device and the second outpouring device; and a weighing device, configured to weigh a static weight of the liquid in the liquid container, wherein the first outpouring precision is lower than the second outpouring precision.

Further, the first outpouring device is a first flow pump or a first flow pump/valve; and/or the second outpouring device is a second flow pump or a second flow pump/valve.

Further, the first outpouring device and the second outpouring device are in two forms of flow pump/valve, the flow pump/valve has at least two switch valves, the at least two switch valves have outlets of different sizes, and opening and closing states of the at least two switch valves can be switched.

With application of the technical solutions in the present disclosure, by providing the first outpouring device and the second outpouring device, the preset liquid is outpoured according to the constant volume at the first outpouring precision, and the single color paste outpouring amount is ensured less than the target outpouring amount. After the outpouring process ends, the liquid outpoured at the constant volume is statically weighed. After the static weighing, the actual color paste outpouring amount is calculated by the computer software analysis, and then the remaining liquid outpouring amount is calculated according to the actual liquid outpouring amount and the target outpouring amount. Finally, the remaining liquid outpouring amount is quantitatively outpoured at the second outpouring precision. Compared with the conventional outpouring method, the influences of complex factors such as the outpouring speed, the flow rate, and the impact inertia can be avoided, the outpouring efficiency of outpouring the preset liquid is improved by the the first outpouring device, and then the remaining liquid outpouring amount is quantitatively outpoured at the constant volume at the second outpouring precision, thus ensuring the outpouring precision.

BRIEF DESCRIPTION OF DRAWINGS

Drawings of the description constituting a part of the present disclosure are used for providing further understanding of the present disclosure. Exemplary embodiments of the present disclosure and descriptions thereof are intended to explain the present disclosure, but do not constitute an improper limitation to the present disclosure. In the drawings:

FIG. 3 shows a flowchart of the liquid outpouring method in another embodiment of the present disclosure.

DETAILED DESCRIPTION OF EMBODIMENTS

It should be noted that the embodiments of the present disclosure and the features in the embodiments may be combined with each other without conflict. The present disclosure will be described in detail below with reference to the drawings and embodiments.

Figure 1:
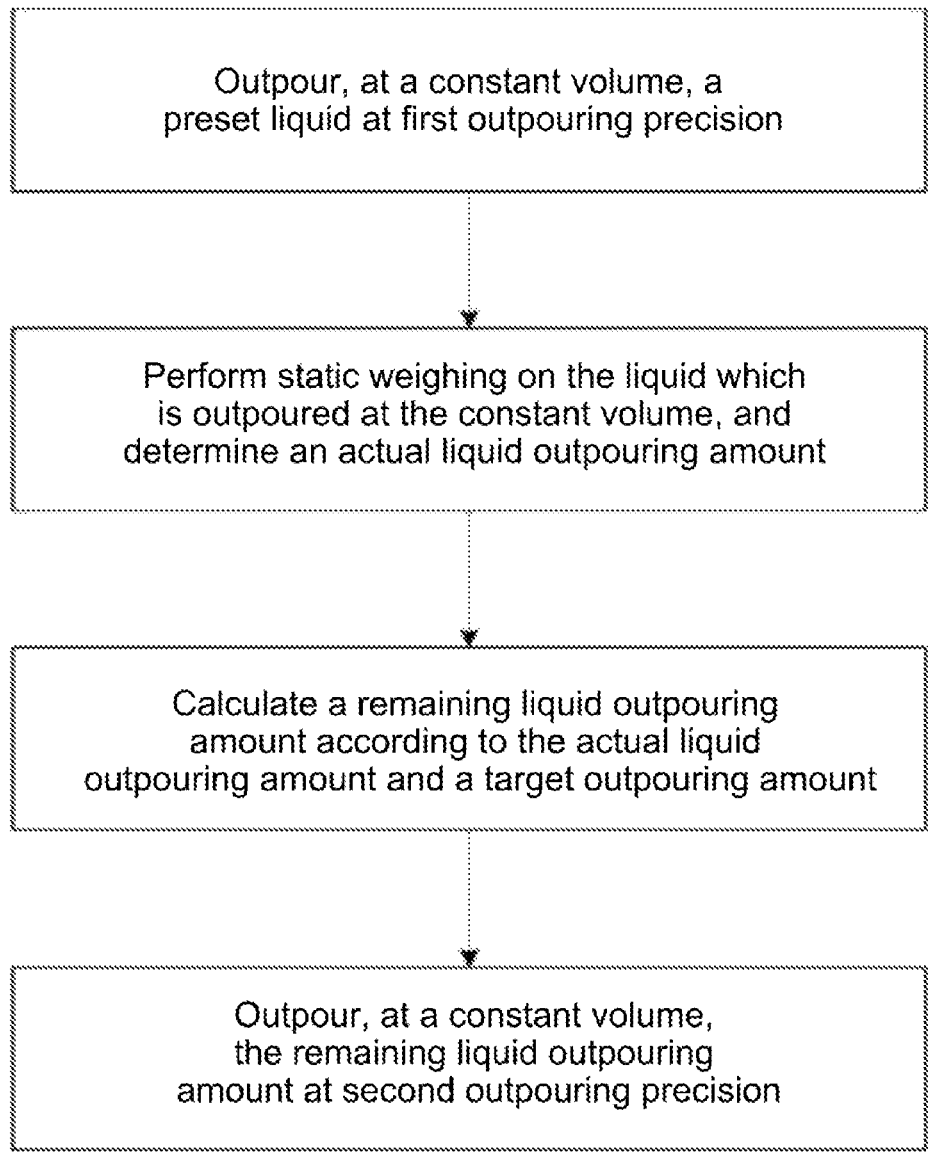
FIG. 1 shows a schematic diagram of a liquid outpouring method according to the present disclosure.
Figure 2:
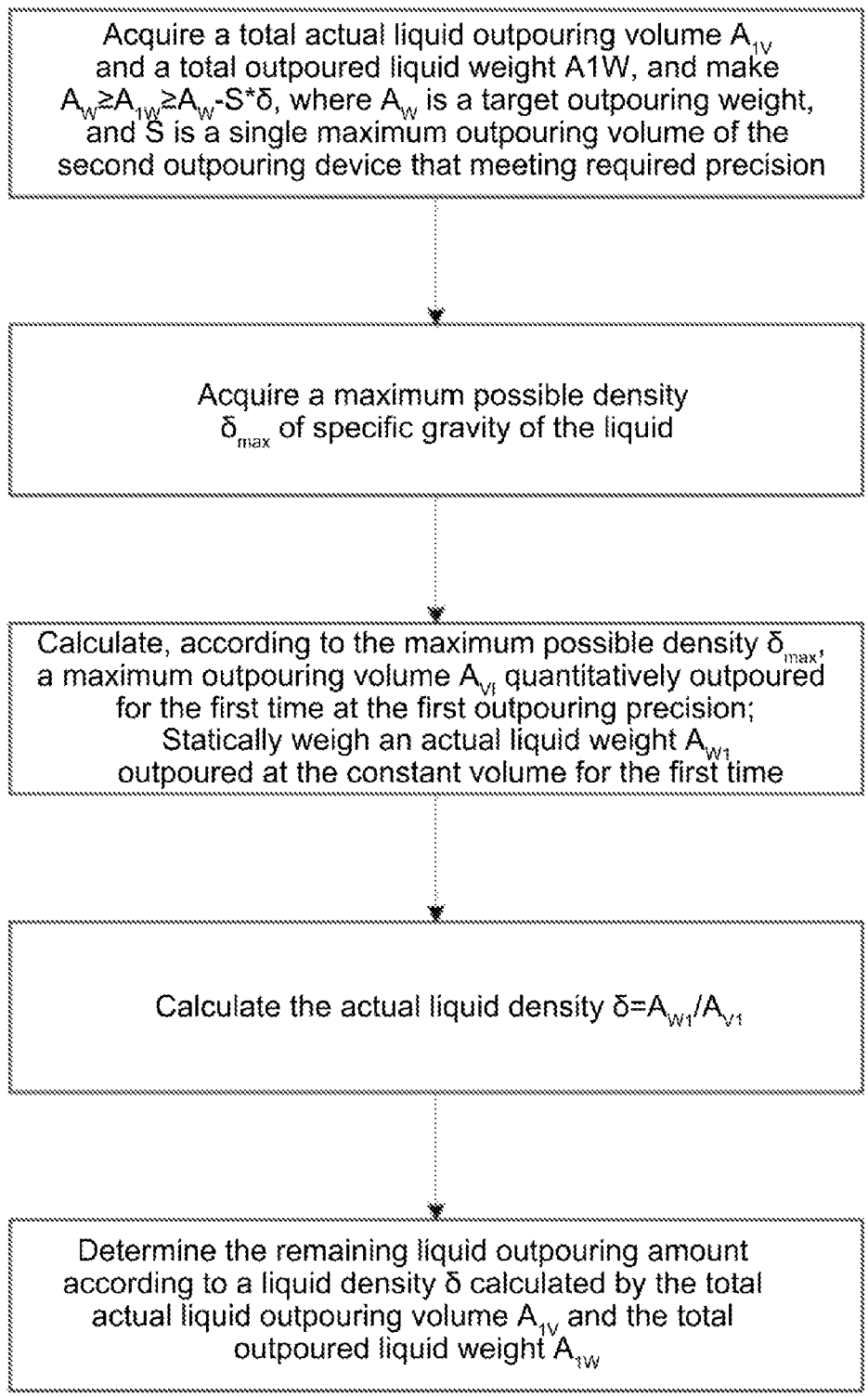
FIG. 2 shows a flowchart of the liquid outpouring method in an embodiment of the present disclosure.

As shown in FIG. 1 to FIG. 3, the present disclosure provides a liquid outpouring method, including: quantitatively outpouring a preset liquid at first outpouring precision; performing static weighing on the liquid which is quantitatively outpoured, and determining an actual liquid outpouring amount; calculating a remaining liquid outpouring amount according to the actual liquid outpouring amount and a target outpouring amount; and quantitatively outpouring the remaining liquid outpouring amount at second outpouring precision, wherein the first outpouring precision is lower than the second outpouring precision, and an outpouring error of the first outpouring precision is greater than an outpouring error of the second outpouring precision.

The first outpouring precision herein refers to outpouring precision of outpouring by a first outpouring device, while the precision of outpouring of the liquid each time is not strictly limited to be equal, and as long as it is ensured that the first outpouring device is used to outpour the liquid each time, the liquid outpouring precision this time is considered as the first outpouring precision.

In the above technical solution, a total target outpouring amount of the liquid is known. Firstly, a preset liquid is quantitatively outpoured according to the first outpouring precision, and a color paste outpouring amount should be ensured less than the target outpouring amount. After the outpouring process ends, static weighing is performed on the quantitatively outpoured liquid. After the static weighing, an actual color paste outpouring amount is calculated by means of computer software analysis, and then the remaining liquid outpouring amount is calculated according to the actual liquid outpouring amount and the target outpouring amount. Finally, the remaining liquid outpouring amount is outpoured at the second outpouring precision. Compared with the conventional outpouring method, the above liquid outpouring method is in a two-step color paste outpouring mode at two outpouring precisions, with an outpouring amount at the first outpouring precision being greater than an outpouring amount at the second outpouring precision. In this way, the outpouring efficiency can be improved by quantitatively outpouring the preset liquid at the first outpouring precision. In addition, after the quantitative outpouring at the first precision ends, the outpoured liquid is statically weighed, which can avoid influences of complex factors such as an outpouring speed, a flow rate, and impact inertia, so as to obtain an accurate remaining liquid outpouring amount, and then the remaining liquid outpouring amount is quantitatively outpoured at the second outpouring precision, thereby ensuring the outpouring precision.

As shown in FIG. 1 and FIG. 2, in an embodiment of the present disclosure, the liquid at the first outpouring precision is outpoured by the first outpouring device according to a set volume, and the liquid at the second outpouring precision is outpoured by the second outpouring device according to a set volume. Before the step of quantitatively outpouring a preset liquid at first outpouring precision, the method further includes: determining a maximum outpouring amount per time of the first outpouring device, a single maximum outpouring amount of the second outpouring device meeting required precision, and the target outpouring amount; and determining the number of outpouring times of the first outpouring device according to the maximum outpouring amount per time of the first outpouring device, the single maximum outpouring amount of the second outpouring device, and the target outpouring amount, so that the remaining liquid outpouring amount after last outpouring of the first outpouring device is less than or equal to the single maximum outpouring amount of the second outpouring device.

In the above technical solution, the number of outpouring times of the first outpouring device can be determined according to the maximum outpouring amount per time of the first outpouring device, the single maximum outpouring amount of the second outpouring device, and the target outpouring amount, so as to ensure that the remaining liquid outpouring amount after the last outpouring of the first outpouring device is less than or equal to the single maximum outpouring amount of the second outpouring device. In this way, the working efficiency can be improved on the basis of meeting the requirements for the color paste outpouring precision.

As shown in FIG. 1 and FIG. 2, in an embodiment of the present disclosure, the step of determining a maximum outpouring amount one time of the first outpouring device includes: taking the single maximum outpouring amount of the second outpouring device as a maximum error of outpouring one time of the first outpouring device; determining the maximum outpouring amount per time of the first outpouring device according to the maximum error of outpouring one time of the first outpouring device, so that an error generated by one time maximum outpouring amount of the last outpouring of the first outpouring device is less than or equal to the preceding maximum error.

Through the above configuration, the first outpouring device only needs to outpour the preset color paste amount once, then the actual color paste outpouring amount is statically weighed by an electronic scale, the remaining liquid outpouring amount is calculated, and then the remaining liquid outpouring amount is completed by the second outpouring device. In this way, the working efficiency can be improved on the basis of meeting the requirements for the color paste outpouring precision.

As shown in FIG. 1 and FIG. 2, in an embodiment of the present disclosure, the step of calculating a remaining liquid outpouring amount according to the actual liquid outpouring amount and a target outpouring amount includes: when the target outpouring amount is in weight, acquiring a total actual liquid outpouring volume $A_{1v}$ and a total outpoured liquid weight $A_{1w}$, and making $A_W \geq A_{1w} \geq A_W - S*\delta$, where $A_W$ is a target outpouring weight, and S is a single maximum outpouring volume of the second outpouring device that meets required precision; and determining the remaining liquid outpouring amount according to a relationship between the total actual liquid outpouring volume $A_{1v}$, the total outpoured liquid weight $A_{1w}$, and a liquid density $\delta$.

In the above technical solution, the actual liquid density is calculated as $\delta = A_{1w}/A_{1v}$ according to the total actual liquid outpouring volume $A_{1v}$ and the total outpoured liquid weight $A_{1w}$, so as to obtain the remaining liquid outpouring weight as $A_W - A_{1v} * A_{1w}/A_{1v}$, and the volume of the liquid to be outpoured by the second outpouring device as $(A_W - A_{1w})/(A_{1w}/A_{1v})$. In this case, the color paste outpouring amount meeting the required precision is completed by the second outpouring device, without the need of continuously feeding the actual measurement value back to the control system, which can avoid influences of factors such as the color paste density, a size of an outpouring port, and viscosity of the color paste, thus improving the applicability of the device.

As shown in FIG. 1 and FIG. 2, in an embodiment of the present disclosure, the liquid density $\delta$ is obtained through the following steps: acquiring a maximum possible density $\delta_{max}$ of specific gravity of the liquid; calculating, according to the maximum possible density $\delta_{max}$, a maximum outpouring volume $A_{vI}$ outpoured for the first time at a constant volume at the first outpouring precision; calculating the actual liquid weight $A_{w1}$ quantitatively outpoured for the first time; and calculating the actual liquid density $\delta = A_{w1}/A_{v1}$. Before the step of outpouring, at a constant volume, the remaining liquid outpouring amount at second outpouring precision, wherein the first outpouring precision is lower than the second outpouring precision, the method further includes: setting an outpouring amount of the last outpouring of the first outpouring device as $A_{n+1}$, $A_{n+1} = (A_W - \Sigma A_{wn} -$ $\Delta A)/\delta$, where $A_{wn}$ is a static weight of the liquid of an outpoured volume for the n-th time, and a maximum possible error $\Delta A$ corresponding to $A_{n+1}$ is less than or equal to S, i.e., $\Delta A \leq S$, and in order to facilitate describing the contents in the present disclosure, $\Delta A$ herein is a positive value corresponding to a corresponding outpouring amount; after the first outpouring device completes the last outpouring, performing the static weighing on the outpoured liquid, to acquire a static weight $A_{W(n+1)}$ for the (n+1)-th time; and calculating the remaining liquid outpouring amount $\Delta V_n = (A_W - \Sigma AW_{(n+1)})/\delta$.

In the above technical solution, firstly, the maximum outpouring volume $A_{VI}$ quantitatively outpoured for the first time at the first outpouring precision is calculated according to the maximum possible density $\delta_{max}$ of specific gravity of the liquid, so that $A_{v1} \cdot \delta_{max}$ is less than the target color paste outpouring amount. The actual liquid weight $A_{w1}$ quantitatively outpoured for the first time is statically weighed by the electronic scale. The actual liquid density $\delta = A_{w1}/A_{v1}$ is calculated by a PLC or computer software connected to a pump system. The set outpouring amount $A_{n+1}$ of the last outpouring of the first outpouring device is calculated according to a total static weight $\Sigma A_{wn}$ of the liquid of the volume that has been outpoured by the first outpouring device several times before and the color paste density $\delta$, i.e., $A_{n+1} = (A_W - \Sigma A_{wn})/\delta$. As the maximum possible error $\Delta A$ corresponding to $A_{n+1}$ is less than or equal to S, it is ensured that the remaining liquid can be outpoured by the second outpouring device. In the above outpouring method, the color paste outpouring amount of the first outpouring device is not affected by factors such as the outpouring speed, the color paste density, and the size of the outpouring port, and it can ensure consistence between the actual color paste outpouring amount and a pre-determined color paste outpouring amount.

Embodiments in which the target outpouring amount is in weight are described below by way of example.

In Embodiment 1, known conditions are as follows: the target outpouring amount $A_W$ was 100 g of the color paste, and the single maximum outpouring amount S of the second outpouring device meeting the required precision was 5 ml. Due to influences of a batch, an air content, and a temperature of the color paste, the actual color paste density $\delta$ was uncertain, but the color paste density $\delta$ did not exceed 1.6 g/ml. The color paste volume outpoured by the first outpouring device met a certain precision requirement, and a final supplementary outpouring volume $\Delta Va$ of the second outpouring device was at high precision. Finally, accuracy of the color paste outpouring amount was evaluated by a total color paste outpouring weight.

When 100 g of the color paste was outpoured by the first outpouring device, by taking the maximum possible value $\delta_{max} = 1.6$ g/ml as the color paste density $\delta$, the set maximum color paste outpouring volume of the first outpouring device was calculated as $A_{v1} = A_W/\delta_{max} = 100/1.6 = 62.5$ ml; the first outpouring device was set to outpour the color paste according to the volume $A_{v1} = 62.5$ ml. Assuming that the weight statically weighed by the electronic scale was $A_{w1} = 96$ g, the color paste density could be obtained as $\delta = 1.536$ g/ml. The final supplementary outpouring volume $\Delta Va = (A_W - A_{w1})/\delta = (100\ g - 96\ g)/1.536\ g/ml = 2.604$ ml was calculated by the PLC or computer program. The supplementary outpouring volume $\Delta Va$ was less than S, which complies with the requirement for supplementary outpouring. The volume $\Delta Va$ was finally supplementarily outpoured, to obtain the color paste amount at required precision.

It should be noted that, in this case, the final color paste outpouring amount $A_0 = (96\ g + \Delta Vwa)$ also could be weighed by the electronic scale to see whether the required precision of the color paste amount was reached, where $\Delta Vwa$ is actual weight of the supplementary outpouring amount.

In the present embodiment, the color paste was outpoured twice in total. The precise outpouring of color paste could be completed through one time of outpouring of the first outpouring device, and one time of outpouring of the second outpouring device.

Specifically, in an embodiment of the present disclosure, the color paste density $\delta$ was uncertain, and was only known not exceeding a certain value $\delta_{max}$, and the target color paste outpouring weight was $A_W$. The color paste volume outpoured by the first outpouring device met a certain precision requirement, and the maximum value of the final supplementary outpouring amount $\Delta Va$ of the second outpouring device was S, in this case, the accuracy of the color paste outpouring amount was evaluated by a total final outpouring mass of the color paste. Firstly, the outpouring amount of the first outpouring device was set according to $\delta_{max}$, so that a set volume of the first time outpouring of the first outpouring device was $A_{v1} \cdot \delta_{max} < A_W$, and the weight was statically weighed by the electronic scale as $A_{w1}$, then actual color paste specific gravity $\delta = A_{w1}/A_{v1}$ could be calculated by the PLC or computer software. After that, according to the determined color paste density $\delta$, multiple times of subsequent color paste outpouring of the first outpouring device, corresponding static weighing of the electronic scale, and the final supplementary outpouring volume $\Delta Va$ of the second outpouring device could be completed, so as to meet the color paste outpouring amount at the required precision. Certainly, the total color paste outpouring amount can also be measured by the electronic scale to see whether the amount at expected required precision is achieved.

In Embodiment 2, known conditions are as follows: the target outpouring amount $A_W$ was 1000 g, the color paste density maximum value $\delta_{max}$ was 1.6 g/ml, the maximum outpouring amount S of the first outpouring device ensuring the precision was 5 ml, and the maximum error $\Delta A$ generated was 0.8 ml when the first outpouring device outpoured 5 ml~1000 ml of the color paste at one time.

Firstly, the first outpouring device was set to outpour a volume $A_{v1}$ of the color paste, where $A_{v1} = (A_W - \Delta A^* \delta)/\delta_{max} = (1000\ g - 0.8\ g)/1.6\ g/ml = 624.5$ ml. Assuming that the weight of $A_{v1}$ statically weighed by the electronic scale was $A_{w1} = 811.85$ g, the color paste density $\delta = A_{w1}/A_{v1} = 811.85/624.5 = 1.3$ g/ml could be obtained, and the remaining outpouring amount was $A_{v1} = (A_W - A_{w1})/\delta = (1000\ g - 811.85\ g)/1.3\ g/ml \approx 144.7$ ml. However, In this case, the remaining outpouring amount was greater than the maximum outpouring amount S of the second outpouring device ensuring the precision. Therefore, the first outpouring device needed to outpour a certain amount $A_{v2}$ of the remaining outpouring amount $A_{v1}$ for the second time. $A_{v2}$ was set as $A_{v2} = A_{v1} - \Delta A = 144.7$ ml $- 0.8$ ml $= 143.9$ ml. Assuming that the actual static weight was $A_{w2} = 186.26$ g after $A_{v2}$ was outpoured, the total color paste remaining outpouring amount was $A_{y2} = (A_W - A_{w1} - A_{w2})/\delta = (1000\ ml - 811.85\ ml - 186.26\ ml)/1.3 = 1.4538$ ml as calculated by the PLC. In this case, $A_{y2} = 1.4538$ ml $< S = 5$ ml, therefore, the second outpouring device could be used to complete the outpouring of the supplementary outpouring amount $\Delta V = A_{y2}/\delta = 1.89/1.3 = 1.4538$ ml, and finally the high-precision color paste outpouring of the target outpouring amount was completed.

As shown in FIG. 1 and FIG. 3, in an embodiment of the present disclosure, the step of calculating a remaining liquid outpouring amount according to the actual liquid outpouring amount and a target outpouring amount includes: when the liquid density δ is known, and the target outpouring amount is in volume, outpouring the liquid of a total volume $A_1$, where $A_1 \geq A_V - S$, $A_V$ is the target outpouring amount, and S is the single maximum outpouring amount of the second outpouring device meeting the required precision; acquiring a total outpoured liquid weight $A_{1w}$ through the static weighing; calculating a total actual outpouring volume $A_{1v}$ according to the total outpoured liquid weight $A_{1w}$ and the liquid density δ; calculating the remaining liquid outpouring amount according to the total actual outpouring volume $A_{1v}$ and the target outpouring amount $A_V$. Before the step of quantitatively outpouring the remaining liquid outpouring amount at second outpouring precision, wherein the first outpouring precision is lower than the second outpouring precision, the method further includes: setting an outpouring amount of the last outpouring of the first outpouring device as $A_{n+1}$, $A_{n+1} = A - \Sigma A_{vn} - \Delta A$, where $A_{vn}$ is an actual volume of the liquid outpoured at the n-th time, and a maximum possible error corresponding to $A_{n+1}$ is $\Delta A \leq S$; after the first outpouring device completes the last outpouring, performing static weighing on the outpoured liquid to acquire a static weight $A_{W(n+1)}$ of the liquid outpoured the last time; calculating an actual volume $\Sigma A_{V(n+1)} = \Sigma A_{W(n+1)}/\delta$ of the outpoured liquid; and calculating the remaining liquid outpouring amount $\Delta V_n = A_V - \Sigma A_{V(n+1)}$.

In the above technical solution, the total outpouring volume $A_1$ satisfies $A_1 \geq A_V - S$, to ensure that the remaining liquid can be outpoured by the second outpouring device. The remaining liquid outpouring amount is calculated according to the total outpoured liquid weight $A_{1w}$ of the first outpouring device, and the total actual outpouring volume $A_{1v}$ can be calculated according to the liquid density δ.

Finally, the remaining liquid outpouring amount can be obtained according to the total actual outpouring volume $A_{1v}$ and the target outpouring amount $A_V$. The above outpouring method can quickly complete the color paste outpouring without real-time weighing, thus improving the working efficiency. Moreover, the remaining liquid outpouring amount calculated by the above method can be outpoured by the second outpouring device, further ensuring high-precision color paste outpouring.

It should be noted that, in an embodiment of the present disclosure, the first outpouring device can outpour a large amount of color paste meeting the precision requirement by controlling the outpouring volume, but it is not necessarily the case that the first outpouring device has a large pumping capacity. Likewise, the second outpouring device can outpour a small amount of color paste by controlling a pump volume, and it outpours a small amount relative to the large outpouring amount, and has high precision, but it is not necessarily the case that the second outpouring device has a small pumping capacity. Sometimes, the same pump can realize both a large amount of outpouring and a small amount of outpouring. There is another case that through pumps with the same capacity, a large amount of quick outpouring and a small amount of high-precision outpouring can be realized by means of different sizes of outpouring ports of a switch valve for the color paste outpouring, wherein a large-size outpouring port is usually used for a large amount of highly efficient outpouring, and a small outpouring port is used for a small amount of high-precision outpouring.

Specifically, in an embodiment of the present disclosure, the constant-volume color paste outpouring of the first outpouring device can be completed by the first outpouring device at one time, provided that when the maximum error of the one-time color paste outpouring amount $A_1$ of the first outpouring device is $\Delta A \leq S$, the one-time outpouring amount of the first outpouring device is $A_1 = A - \Delta A$, and when the static weigh obtained by the electronic scale is $A_W 1 \geq A - S$, the first outpouring device can complete the outpouring of the set color paste amount and the static weighing by only one time of outpouring, and then ΔVa is supplementarily outpoured by the second outpouring device.

Embodiments in which the target outpouring amount is in volume are described below by way of example.

In Embodiment 3, known conditions are as follows: the target outpouring amount $A_V$ was 100 ml, the color paste density δ was 1.2 g/ml, the maximum outpouring amount S of the second outpouring device ensuring the precision requirement was 5 ml, and the maximum error ΔA of one-time outpouring of the first outpouring device did not exceed 2 ml.

The first outpouring device was set with the outpouring volume $A_{v1} = A_V - \Delta A = (100\ ml - 2\ ml) = 98\ ml$, and the actual color paste outpouring volume $A_{1w}$ was statically weighed by the electronic scale as 118.2 g, thus the actual color paste outpouring volume was obtained as $A_{1v} = A_{1w}/\delta = 118.2/1.2 = 98.5\ ml$, and then the final supplementary outpouring amount was calculated according to the target outpouring amount as $\Delta V_1 = A_V - A_{1v} = 100\ ml - 98.5\ ml = 1.5\ ml$. Finally, 1.5 ml of the color paste was supplementarily outpoured by the second outpouring device, thus completing the outpouring of the target color paste amount.

It should be noted that in an embodiment of the present disclosure, if an error $\Delta A_a$ of the first outpouring device was greater than S when a final color paste outpouring amount A was completed in one-time outpouring, the first outpouring device needed to complete, in two or multiple times, the outpouring of each specific set volume as well as static weighing of corresponding amount, while the subsequent outpouring amount of the first outpouring device should be set as ensuring that the actual outpouring amount plus the former actual outpouring amount of the first outpouring device did not exceed the final outpouring amount A, that is, when setting the last outpouring amount of the first outpouring device, the maximum color paste outpouring error possibly generated by the current actual outpouring amount should be added, so as to prevent a sum of the last outpouring amount of the first outpouring device and the previous outpouring amount from exceeding the target amount A.

Specifically, in an embodiment of the present disclosure, the last outpouring amount of the first outpouring device was set to be calculated according to the static weights of the outpouring volumes of the first outpouring device in previous times and the color paste density δ. The last outpouring amount of the first outpouring device should ensure the maximum possible error thereof ΔA to be less than or equal to S. Finally, the total color paste outpouring amount of the first outpouring device is statically weighed by the electronic scale, and the supplementary outpouring amount of the second outpouring device is calculated, so as to satisfy the color paste outpouring amount at the required precision.

In Embodiment 4, known conditions are as follows: the target outpouring amount $A_V$ was 1000 ml, the color paste density δ was 1.2 g/ml, and the maximum outpouring amount S of the second outpouring device ensuring the precision was 5 ml, a maximum error $\Delta A_a = 8$ ml generated when the first outpouring device outpoured 700 ml~1000 ml of the color paste at one time was greater than S=5 ml. In this case, when the one-time outpouring amount of the first outpouring device met the color paste outpouring requirement, it was tended to cause the maximum error generated to exceed the maximum outpouring amount of the second outpouring device that ensures the precision.

When the first outpouring device outpoured 100 ml~600 ml of the color paste at one time, the generated maximum error $\Delta A_b=3$ ml was less than S=5 ml, therefore, the first outpouring device first could be set to outpour the color paste of $A_1=600$ ml for the first time. Assuming that the outpoured color paste weight $A_{1w}$ was statically weighed by the electronic scale to be 722.4 g after the outpouring, and the actual outpouring volume was calculated to be $A_{1v}=A_{1w}/\delta=722.4/1.2=602$ ml by the PLC according to the color paste density $\delta$, then the remaining liquid outpouring amount was $A_{v1}=A_V-A_{1v}=1000$ ml$-602$ ml$=398$ ml.

In this case, the second outpouring device was set with a second outpouring volume $A_2=A_V-A_1-\Delta A_b=1000$ ml$-602$ ml$-3$ ml$=395$ ml, then the maximum possible value of the remaining outpouring volume might be $\Delta V_1=A_V-A_1-A_2=1000$ ml$-602$ ml$-395$ ml$=3$ ml, and $\Delta V_1=3$ ml$<$S$=5$ ml, therefore, it could be used as the supplementary outpouring amount of the second outpouring device. Assuming that the actual color paste outpouring amount of the first outpouring device statically weighed by the electronic scale was $A_{1w}=1197.12$ g, the actual color paste outpouring volume was thereby obtained as $A_{1v}=A_{1w}/\delta=1197.12/1.2=997.6$ ml, and then the final supplementary outpouring amount $\Delta V_1=A_V-A_{1v}=1000$ ml$-997.6$ ml$=2.4$ ml was calculated according to the target outputting amount. Finally, 2.4 ml of the color paste was supplementarily outpoured by the second outpouring device, thus completing the outpouring of the target color paste amount.

As shown in FIG. 1 to FIG. 3, in an embodiment of the present disclosure, the liquid outpouring method further includes: performing static weighing on the outpoured liquid after finally completing the liquid outpouring, and verifying whether the outpoured liquid meets the precision requirement.

By means of the above configuration, the precision of the outpoured liquid can be verified, and a colored paint prepared by the colorant dispenser is ensured meeting the precision requirement.

In another aspect of the present disclosure, provided is a liquid outpouring device using the above liquid outpouring method, including: a first outpouring device, capable of quantitatively outpouring a liquid at first outpouring precision; a second outpouring device, capable of quantitatively outpouring the liquid at second outpouring precision; a liquid container, configured to carry the liquid outpoured by the first outpouring device and the second outpouring device; and a weighing device, configured to weigh a static weight of the liquid in the liquid container, wherein the first outpouring precision is lower than the second outpouring precision.

Through the above configuration, the blending efficiency can be improved while ensuring the color paste outpouring precision.

As shown in FIG. 1 to FIG. 3, in an embodiment of the present disclosure, the first outpouring device is a first flow pump or a first flow pump/valve; and/or the second outpouring device is a second flow pump or a second flow pump/valve.

In the above technical solution, the first outpouring device is the first flow pump or the first flow pump/valve, and the second outpouring device is the second flow pump or the second flow pump/valve, and the first flow pump or the first flow pump/valve has the characteristics of a large outpouring flow rate and high efficiency, and the second flow pump or the second flow pump/valve has the characteristics of a small outpouring flow rate but higher precision than the first flow pump or the first flow pump/valve. By means of the combination of two pumps or valves, the blending efficiency can be improved while ensuring the color paste outpouring precision.

As shown in FIG. 1 to FIG. 3, in an embodiment of the present disclosure, the first outpouring device and the second outpouring device are in two forms of flow pump/valve, wherein each flow pump/valve has at least two switch valves, the at least two switch valves have outlets of different sizes, and opening and closing states of the at least two switch valves can be switched.

Through the above configuration, the liquid outpouring device can be used for colorant dispensers and filling machines of different structures, further improving the applicability of the liquid outpouring device.

From the above description, it can be seen that the above embodiments of the present disclosure achieve the following technical effects: by providing the first outpouring device and the second outpouring device, the preset liquid is outpoured according to the first outpouring precision, and the color paste outpouring amount is ensured less than the target outpouring amount. After the outpouring process ends, the quantitatively outpoured liquid is statically weighed. After the static weighing, the actual color paste outpouring amount is calculated by the computer software analysis, and then the remaining liquid outpouring amount is calculated according to the actual liquid outpouring amount and the target outpouring amount. Finally, the remaining liquid outpouring amount is quantitatively outpoured at the second outpouring precision. Compared with the conventional outpouring method, the influences of complex factors such as the outpouring speed, the flow rate, and the impact inertia can be avoided, the outpouring efficiency of outpouring the preset liquid is improved quantitatively by the first outpouring device, and then the remaining liquid outpouring amount is quantitatively outpoured at the second outpouring precision, thus ensuring the outpouring precision.

It should be noted that the terms used herein are only for the purpose of describing specific implementations, but are not intended to limit exemplary implementations in accordance with the present disclosure. As used herein, the singular form is also intended to include the plural form as well, unless clearly indicated otherwise in the context. Besides, it also should be understood that when the terms "contain" and/or "include" are used in the present description, they indicate the presence of a feature, a step, an operation, a part, a component, and/or a combination thereof.

It should be noted that the terms "first", "second" and the like in the description, the claims, and the above drawings of the present disclosure are used for distinguishing similar objects, rather than for describing a specific order or sequence. It should be understood that the terms used in this way may be exchanged where appropriate, so that the implementations of the present disclosure described herein can be implemented in an order other than those illustrated or described herein.

The above-mentioned are merely for preferred implementations of the present disclosure, but are not used to limit the present disclosure. For those skilled in the art, various modifications and changes could be made to the present disclosure. Any modifications, equivalent substitutions, improvements and so on made within the spirit and principle of the present disclosure should be covered within the scope of protection of the present disclosure.

INDUSTRIAL APPLICABILITY

The liquid outpouring method provided in the present disclosure, compared with the conventional outpouring method, can avoid influences of complex factors such as the outpouring speed, the flow rate, and the impact inertia, improve the outpouring efficiency of outpouring the preset liquid by the outpouring of the first outpouring device at constant volume, and then the remaining liquid outpouring amount is outpoured at the constant volume at the second outpouring precision, which ensures the outpouring precision, thus improving the blending efficiency and the blending precision of the colorant dispenser.

What is claimed is:

1. A liquid outpouring method, comprising steps of:
   outpouring, at a constant volume, a preset liquid at a first outpouring precision;
   performing static weighing on the liquid outpoured at the constant volume, and determining an actual liquid outpouring amount;
   calculating, according to the actual liquid outpouring amount and a target outpouring amount, a remaining liquid outpouring amount; and
   outpouring, at a constant volume, the remaining liquid outpouring amount at a second outpouring precision, wherein the first outpouring precision is lower than the second outpouring precision, and an outpouring error of outpouring the liquid at the first outpouring precision is greater than an outpouring error of outpouring the liquid at the second outpouring precision.

2. The liquid outpouring method according to claim 1, wherein the liquid at the first outpouring precision is outpoured by the first outpouring device according to a set volume, and the liquid at the second outpouring precision is outpoured by the second outpouring device according to a set volume, and before a step of quantitatively outpouring the preset liquid at the first outpouring precision, the method further comprises steps of:
   determining a maximum outpouring amount per time of the first outpouring device, a single maximum outpouring amount of the second outpouring device meeting a required precision, and the target outpouring amount; and
   determining number of outpourings of the first outpouring device according to the maximum outpouring amount per time of the first outpouring device, the single maximum outpouring amount of the second outpouring device, and the target outpouring amount, so that the remaining liquid outpouring amount after last outpouring of the first outpouring device is less than or equal to the single maximum outpouring amount of the second outpouring device.

3. The liquid outpouring method according to claim 2, wherein the step of determining a maximum outpouring amount per time of the first outpouring device comprises:
   taking the single maximum outpouring amount of the second outpouring device as a maximum error of outpouring per time of the first outpouring device; and
   determining the maximum outpouring amount per time of the first outpouring device according to the maximum error of outpouring per time of the first outpouring device, so that an error generated by one time maximum outpouring amount of the last outpouring of the first outpouring device is less than or equal to the maximum error.

4. The liquid outpouring method according to claim 1, wherein the step of calculating according to the actual liquid outpouring amount and a target outpouring amount a remaining liquid outpouring amount comprises:
   when the target outpouring amount is in weight,
   acquiring a total actual liquid outpouring volume $A_{1V}$ and a total outpoured liquid weight $A_{1W}$, and making $A_W \geq A_{1W} \geq A_W - S*\delta$, where $A_W$ is a target outpouring weight, and S is a single maximum outpouring volume of the second outpouring device meeting a required precision; and
   determining the remaining liquid outpouring amount according to a liquid density $\delta$ calculated by the total actual liquid outpouring volume $A_{1V}$ and the total outpoured liquid weight $A_{1W}$.

5. The liquid outpouring method according to claim 4, wherein the liquid density $\delta$ is obtained through steps of:
   acquiring a maximum possible density $\delta_{max}$ of specific gravity of the liquid;
   calculating, according to the maximum possible density $\delta_{max}$, a maximum outpouring volume $A_{V1}$ quantitatively outpoured for the first time at the first outpouring precision;
   weighing statically an actual liquid weight Aw outpoured at the constant volume for the first time; and
   calculating an actual liquid density $\delta = A_{W1}/A_{V1}$.

6. The liquid outpouring method according to claim 5, wherein before a step of quantitatively outpouring the remaining liquid outpouring amount at a second outpouring precision wherein the first outpouring precision is lower than the second outpouring precision, the method further comprises:
   setting an outpouring volume of the last outpouring of the first outpouring device as $A_{n+1}$, $A_{n+1} = (A_W - \Sigma A_{Wn} - \Delta A)/\delta$, where $A_{Wn}$ is a static weight of liquid of an outpoured volume for the n-th time, and a maximum possible error corresponding to $A_{n+1}$ is $\Delta A \leq S$; and
   performing, after the first outpouring device completes the last outpouring, the static weighing on the liquid outpoured for the (n+1)-th time, to acquire a static weight $A_{W(n+1)}$ for the (n+1)-th time; and calculating the remaining liquid outpouring volume $\Delta V_n = (A_W - \Sigma AW_{(n+1)})/\delta$.

7. The liquid outpouring method according to claim 1, wherein the step of calculating according to the actual liquid outpouring amount and a target outpouring amount a remaining liquid outpouring amount comprises:
   when the liquid density $\delta$ is known, and the target outpouring amount is in volume, outpouring, by the first outpouring device, the liquid of a set total volume $A_1$, where $A_V \geq A_1 \geq A_V - S$, $A_V$ is the target outpouring volume, and S is the single maximum outpouring volume of the second outpouring device meeting a required precision;
   acquiring a total outpoured liquid weight $A_{1W}$ through the static weighing; and
   calculating a total actual outpouring volume $A_{1V}$ according to the total outpoured liquid weight $A_{1W}$ and the liquid density $\delta$; and calculating the remaining liquid outpouring amount according to the total actual outpouring volume $A_{1V}$ and the target outpouring amount $A_V$.

8. The liquid outpouring method according to claim 7, wherein before a step of quantitatively outpouring the remaining liquid outpouring amount at a second outpouring precision wherein the first outpouring precision is lower than the second outpouring precision, the method further comprises:

setting an outpouring volume of the last outpouring of the first outpouring device as $A_{n+1}$, $A_{n+1}=A-\Sigma A_{Vn}-\Delta A$, where $A_{Vn}$ is a total actual volume of the liquid of an outpoured volume, and a maximum possible error corresponding to $A_{n+1}$ is $\Delta A \leq S$;

performing, after the first outpouring device completes the last outpouring, the static weighing on the outpoured liquid to acquire a static weight $\Sigma A_{W(n+1)}$;

calculating an actual volume $\Sigma A_{V(n+1)}=\Sigma A_{W(n+1)}/\delta$ of the outpoured liquid; and calculating the remaining liquid outpouring amount $\Delta V_n = A_V - \Sigma A_{V(n+1)}$.

9. The liquid outpouring method according to claim 1, further comprising:

performing the static weighing on the outpoured liquid after finally completing the liquid outpouring, and verifying whether the outpoured liquid meets precision requirement.

10. A liquid outpouring device using the above-liquid outpouring method according to claim 1, comprising:

a first outpouring device, capable of quantitatively outpouring liquid at the first outpouring precision;

a second outpouring device, capable of quantitatively outpouring the liquid at the second outpouring precision;

a liquid container, configured to carry the liquid outpoured by the first outpouring device and the second outpouring device; and a weighing device, configured to weigh a static weight of the liquid in the liquid container, wherein the first outpouring precision is lower than the second outpouring precision.

11. The liquid outpouring device according to claim 10, wherein the first outpouring device is a first flow pump or a first flow pump/valve; and/or the second outpouring device is a second flow pump or a second flow pump/valve.

12. The liquid outpouring device according to claim 10, wherein the first outpouring device and the second outpouring device are in two forms of flow pump/valve, the flow pump/valve has at least two switch valves, the at least two switch valves have outlets of different sizes, and opening and closing states of the at least two switch valves can be switched.

13. The liquid outpouring method according to claim 3, wherein the step of calculating according to the actual liquid outpouring amount and a target outpouring amount a remaining liquid outpouring amount comprises:

when the target outpouring amount is in weight, acquiring a total actual liquid outpouring volume $A_{1V}$ and a total outpoured liquid weight $A_{1W}$, and making $A_W \geq A_{1W} \geq A_W - S*\delta$, where $A_W$ is a target outpouring weight, and S is a single maximum outpouring volume of the second outpouring device meeting a required precision; and determining the remaining liquid outpouring amount according to a liquid density $\delta$ calculated by the total actual liquid outpouring volume $A_{1V}$ and the total outpoured liquid weight $A_{1W}$.

14. The liquid outpouring method according to claim 3, wherein the step of calculating according to the actual liquid outpouring amount and a target outpouring amount a remaining liquid outpouring amount comprises:

when the liquid density $\delta$ is known, and the target outpouring amount is in volume, outpouring, by the first outpouring device, the liquid of a set total volume $A_1$, where $A_V \geq A_1 \geq A_V - S$, $A_V$ is the target outpouring volume, and S is the single maximum outpouring volume of the second outpouring device meeting a required precision;

acquiring a total outpoured liquid weight $A_{1W}$ through the static weighing; and calculating a total actual outpouring volume $A_{1V}$ according to the total outpoured liquid weight $A_{1W}$ and the liquid density $\delta$; and calculating the remaining liquid outpouring amount according to the total actual outpouring volume $A_{1v}$ and the target outpouring amount $A_V$.

\* \* \* \* \*